US011659484B2

(12) United States Patent
He et al.

(10) Patent No.: US 11,659,484 B2
(45) Date of Patent: May 23, 2023

(54) SECONDARY CELL ACTIVATION WITH DISCONTINUOUS RECEPTION GROUPS

(71) Applicant: QUALCOMM Incorporated, San Diego, CA (US)

(72) Inventors: Linhai He, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 17/248,492

(22) Filed: Jan. 27, 2021

(65) Prior Publication Data

US 2021/0243690 A1    Aug. 5, 2021

Related U.S. Application Data

(60) Provisional application No. 62/970,679, filed on Feb. 5, 2020.

(51) Int. Cl.
| | | |
|---|---|---|
| *H04W 52/02* | (2009.01) | |
| *H04W 76/28* | (2018.01) | |
| *H04W 72/04* | (2023.01) | |

(52) U.S. Cl.
CPC ... *H04W 52/0206* (2013.01); *H04W 72/0406* (2013.01); *H04W 76/28* (2018.02)

(58) Field of Classification Search
CPC ............. H04W 52/0206; H04W 76/28; H04W 72/0406
USPC ......................................................... 370/318
See application file for complete search history.

(56) References Cited

U.S. PATENT DOCUMENTS

| | | | |
|---|---|---|---|
| 2019/0021052 A1* | 1/2019 | Kadiri | H04W 52/0206 |
| 2020/0112919 A1* | 4/2020 | Nam | H04B 7/0617 |
| 2021/0321437 A1* | 10/2021 | Liu | H04W 52/0216 |

* cited by examiner

*Primary Examiner* — Gbemileke J Onamuti
(74) *Attorney, Agent, or Firm* — Harrity & Harrity, LLP

(57) ABSTRACT

Various aspects of the present disclosure generally relate to wireless communication. In some aspects, a user equipment (UE) may determine that a secondary cell (SCell) is to be activated for the UE or switched from a dormant state to an active state, where the SCell is in a discontinuous reception (DRX) group. The UE may set a DRX state for the SCell based at least in part on determining a DRX state of other SCells in the DRX group or determining that there are no existing SCells in the DRX group. Numerous other aspects are provided.

24 Claims, 6 Drawing Sheets

400 ⟶

430
Determine that secondary cell (SCell) in discontinuous reception (DRX) group is to be activated or switched from dormant state to active state 440
Determine that transmission on SCell is to be activated or switched from dormant state to active state 445
Set state of SCell based at least in part on determining state of other SCells in DRX group or that there are no existing SCells in DRX group 450
Activate channel monitoring or transmission on SCell based at least in part on UE entering DRX active state 435
Transmit instruction to either enter DRX active state immediately or set activation state of SCell based at least in part on activation state of other SCells in DRX group

BS 410

UE 420

SECONDARY CELL ACTIVATION WITH DISCONTINUOUS RECEPTION GROUPS

CROSS REFERENCE TO RELATED APPLICATION

This Patent application claims priority to U.S. Provisional Patent Application No. 62/970,679, filed on Feb. 5, 2020, entitled "SECONDARY CELL ACTIVATION WITH DISCONTINUOUS RECEPTION GROUPS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for secondary cell activation with discontinuous reception groups.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication, performed by a user equipment (UE), may include determining that a secondary cell (SCell) is to be activated for the UE or switched from a dormant state to an active state. The SCell may be in a discontinuous reception (DRX) group. The method may include setting a DRX state for the SCell based at least in part on determining a DRX state of other SCells in the DRX group or determining that there are no existing SCells in the DRX group.

In some aspects, a method of wireless communication, performed by a base station, may include determining that an SCell to be activated by a UE is in a DRX group or switched from a dormant state to an active state, and transmitting an instruction to the UE to set a DRX state for the SCell based at least in part on determining a DRX state of other SCells in the DRX group or determining that there are no existing SCells in the DRX group.

In some aspects, a UE configured for wireless communication may include a memory and one or more processors operatively coupled to the memory. The memory and the one or more processors may be configured to determine that an SCell is to be activated for the UE or switched from a dormant state to an active state, wherein the SCell is in a DRX group, and set a DRX state for the SCell based at least in part on determining a DRX state of other SCells in the DRX group or determining that there are no existing SCells in the DRX group.

In some aspects, a base station configured for wireless communication may include a memory and one or more processors operatively coupled to the memory. The memory and the one or more processors may be configured to determine that an SCell to be activated by a UE is in a DRX group or switched from a dormant state to an active state, and transmit an instruction to the UE to set a DRX state for the SCell based at least in part on determining a DRX state of other SCells in the DRX group or determining that there are no existing SCells in the DRX group.

In some aspects, a non-transitory computer-readable medium may store one or more instructions for wireless communication. The one or more instructions, when executed by one or more processors of a UE, may cause the one or more processors to determine that an SCell is to be activated for the UE or switched from a dormant state to an active state, where the SCell is in a DRX group, and set a DRX state for the SCell based at least in part on determining a DRX state of other SCells in the DRX group or determining that there are no existing SCells in the DRX group.

In some aspects, a non-transitory computer-readable medium may store one or more instructions for wireless communication. The one or more instructions, when executed by one or more processors of a base station, may cause the one or more processors to determine that an SCell to be activated by a UE is in a DRX group or switched from a dormant state to an active state, and transmit an instruction to the UE to set a DRX state for the SCell based at least in part on determining a DRX state of other SCells in the DRX group or determining that there are no existing SCells in the DRX group.

In some aspects, an apparatus for wireless communication may include means for determining that an SCell is to be activated for the apparatus or switched from a dormant state to an active state, where the SCell is in a DRX group, and means for setting a DRX state for the SCell based at least in part on determining a DRX state of other SCells in the DRX group or determining that there are no existing SCells in the DRX group.

In some aspects, an apparatus for wireless communication may include means for determining that a SCell to be activated by a UE is in a DRX group or switched from a dormant state to an active state, and means for transmitting an instruction to the UE to set a DRX state for the SCell based at least in part on determining a DRX state of other SCells in the DRX group or determining that there are no existing SCells in the DRX group.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
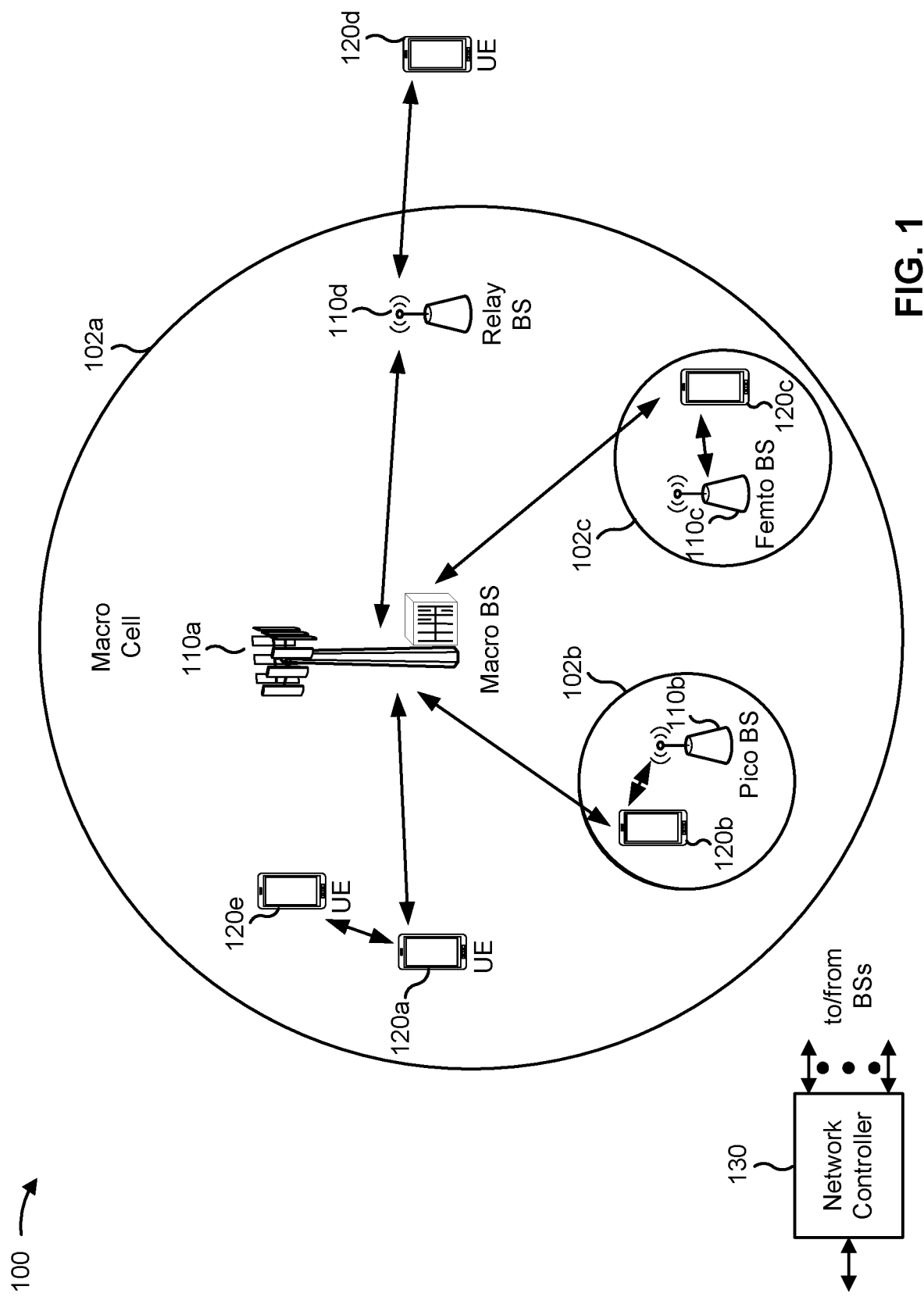
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Figure 2:
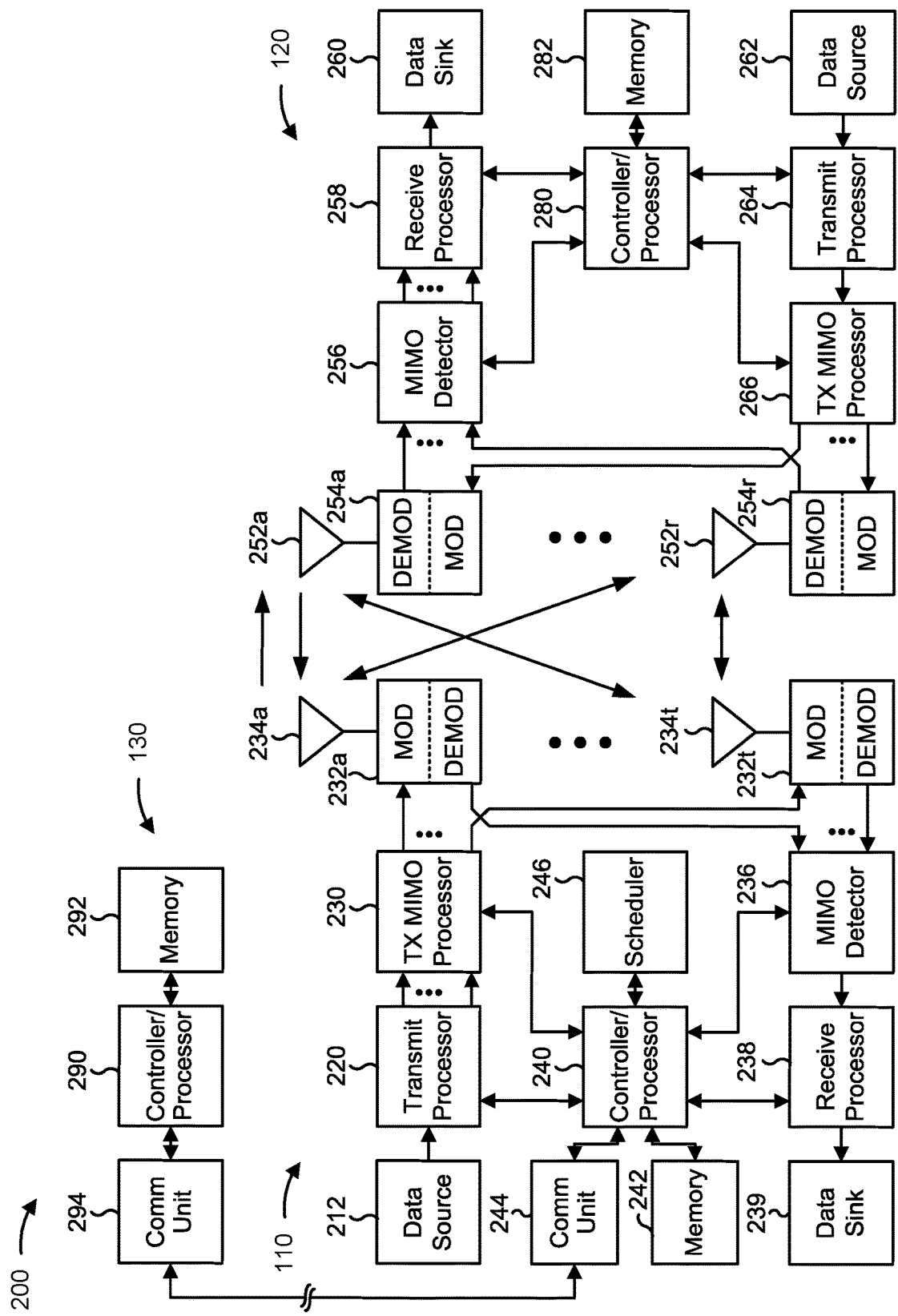
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 1-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 1-6.

Controller/processor 240 of base station 110, controller/processor 280 of UE 120, and/or any other component(s) of FIG. 2 may perform one or more techniques associated with secondary cell activation with discontinuous reception (DRX) groups, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, UE 120 may include means for determining that a secondary cell (SCell) is to be activated for the UE or switched from a dormant state to an active state, where the SCell is in a DRX group, and/or means for setting a DRX state for the SCell based at least in part on determining a DRX state of other SCells in the DRX group or determining that there are no existing SCells in the DRX group. In some aspects, the means for UE 120 may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining that an SCell to be activated by a UE is in a DRX group or switched from a dormant state to an active state, and/or means for transmitting an instruction to the UE to set a DRX state for the SCell based at least in part on determining a DRX state of other SCells in the DRX group or determining that there are no existing SCells in the DRX group. In some aspects, the means for base station 110 may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
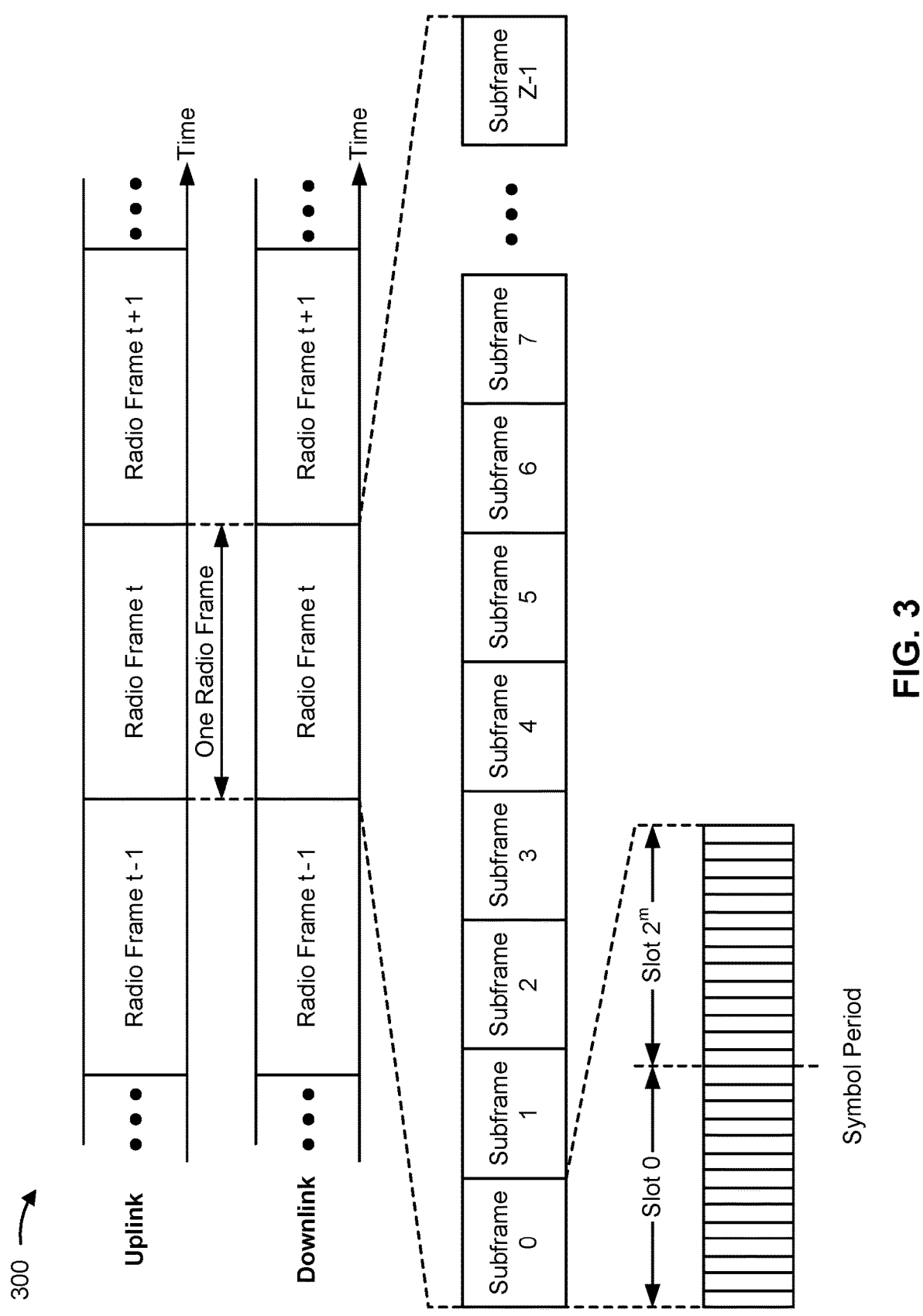
FIG. 3 shows an example frame structure for frequency division duplexing in a telecommunications system, in accordance with the present disclosure.

FIG. 3 shows an example frame structure 300 for frequency division duplexing in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., 2$^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for a frequency division duplexing may be frame-based, subframe-based, slot-based, and/or symbol-based.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a base station may transmit synchronization signals. For example, a base station may transmit a primary synchronization signal (PSS) or a secondary synchronization signal (SSS) on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks).

As indicated above, FIG. 3 is provided as an example. Other examples may differ from what is described with respect to FIG. 3.

In some communications systems, such as NR, a UE may monitor a physical downlink control channel (PDCCH) in each subframe or slot to determine whether to receive downlink data from a base station. However, when the UE remains connected to the base station to monitor the PDCCH in each subframe or slot, the UE may use excessive power resources, which may limit UE battery life. Thus, the UE may enable a DRX mode to enable the UE to periodically transfer from a first mode (e.g., a high-power mode) to a second mode (e.g., a low-power mode) to reduce power consumption, thereby enhancing UE battery life.

A UE may communicate with the base station on multiple carriers in a carrier aggregation (CA) configuration. In CA, the UE may communicate on a primary cell (PCell) and activate transmission on one or more secondary cells (SCells). Accordingly, an SCell may be in an active state or an inactive state when the UE is in a DRX mode. A UE may not activate transmission on an SCell unless the UE is in a DRX active state.

A DRX group may include one or more SCells that may share a same state when the UE is in DRX mode. A DRX group may include one or more SCells that are associated with a DRX state even though states for SCells in the DRX group may differ. The states may include active, inactive, or dormant. In a dormant state, an SCell may be configured for data transmission but not used for data transmission or for monitoring the PDCCH. The UE may not consider a dormant SCell for DRX operation with other active SCells in the same DRX group. SCells in different DRX groups may have different states, such as with mixed FR1 and FR2 carriers. For example, FR1 carriers may be configured with a shorter DRX active duration and a shorter DRX inactivity timer than FR2 carriers. The UE may apply an existing DRX configuration to FR1 and a secondary DRX configuration to FR2.

While SCells may form a DRX group, the behavior for activating transmission on the SCell in a DRX group has not been specified. If a UE does not have a defined behavior for SCell activation with DRX groups, the UE may waste time before activating the SCell, or the UE may waste resources handling activation of one SCell when there are other SCells in the DRX group.

In various aspects described herein, a UE may be configured with a behavior for activating transmission on an SCell that is in a DRX group. In some aspects, as a first option for the behavior, the UE may activate an SCell in a DRX group by immediately entering a DRX active state. Entering a DRX active state immediately may include entering the DRX state within a threshold period of time from when the instruction is received, not waiting for another trigger or state change to enter a DRX active state, entering DRX active state as a next action, and/or the like. A reason for entering DRX active state immediately may be to allow a base station to schedule data faster and thus activation may start as soon as possible. In this option, there may be no other existing SCells in the DRX group.

In some aspects, as a second option of the behavior, the UE may activate an SCell in a DRX group by first setting a state of the SCell to a state of other SCells in the DRX group, such that the UE may activate transmission on all SCells in the DRX group at the same time. There may be other SCells in the DRX group that are in an inactive state. If the UE sets an activation state of the SCell to an activation state of existing SCells in the DRX group, the UE may save power and processing resources. It may be easier for the UE to activate SCells in the DRX group when the SCells in the DRX group are in the same activation state. In some aspects, a base station may configure the UE as to which option to use. In some aspects, the UE may follow either option when an SCell is switched from a dormant state to an active state.

Figure 4:
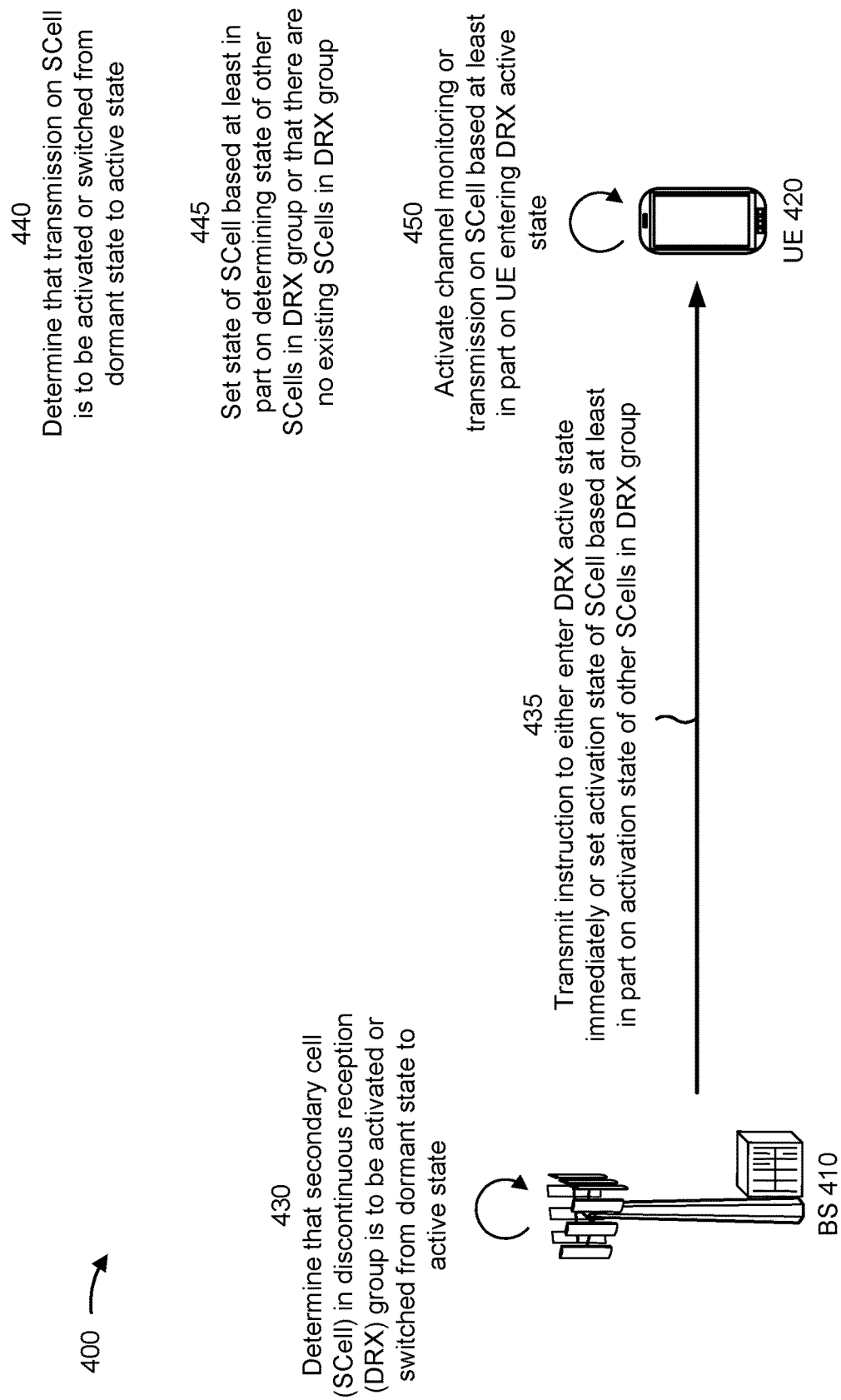
FIG. 4 is a diagram illustrating an example of secondary cell activation with discontinuous reception groups, in accordance with the present disclosure.

FIG. 4 is a diagram illustrating an example 400 of SCell activation with DRX groups, in accordance with the present disclosure. FIG. 4 shows a BS 410 (e.g., BS 110 depicted in FIGS. 1 and 2) that may communicate with a UE 420 (e.g., UE 120 depicted in FIGS. 1 and 2).

As shown by reference number 430, BS 410 may determine that an SCell to be activated by UE 420, or switched from a dormant state to an active state, is in a DRX group. SCells in the DRX group may share an activation state while UE 420 is in a DRX mode. BS 410 may determine an option for UE behavior when activating transmission on the SCell in the DRX group.

As shown by reference number 435, BS 410 may transmit an instruction to UE 420. The instruction may instruct UE 420 to either enter a DRX active state immediately or set an activation state of the SCell based at least in part on an activation state of other SCells in the DRX group.

As shown by reference number 440, UE 420 may determine that transmission on an SCell is to be activated or switched from a dormant state to an active state. As shown by reference number 445, in some aspects, UE 420 may set the DRX state of the SCell to immediately enter the DRX active state or to a state of other SCells of the DRX group, based at least in part on a determination of a state of other SCells in the DRX group or a determination that there are no existing SCells in the DRX group. Activation of transmission on an SCell may require UE 420 to enter the DRX active state, and thus, as shown by reference number 450, UE 420 may enter the DRX active state and activate monitoring of a physical downlink channel and transmission on the SCell. In some aspects, UE 420 may set an activation state of the SCell (and of other SCells) to an activation state of other SCells in the DRX group. As a result, UE 420 may be configured with a more optimal behavior when activating transmission on an SCell that is in a DRX group.

As indicated above, FIG. 4 is provided as an example. Other examples may differ from what is described with respect to FIG. 4.

Figure 5:
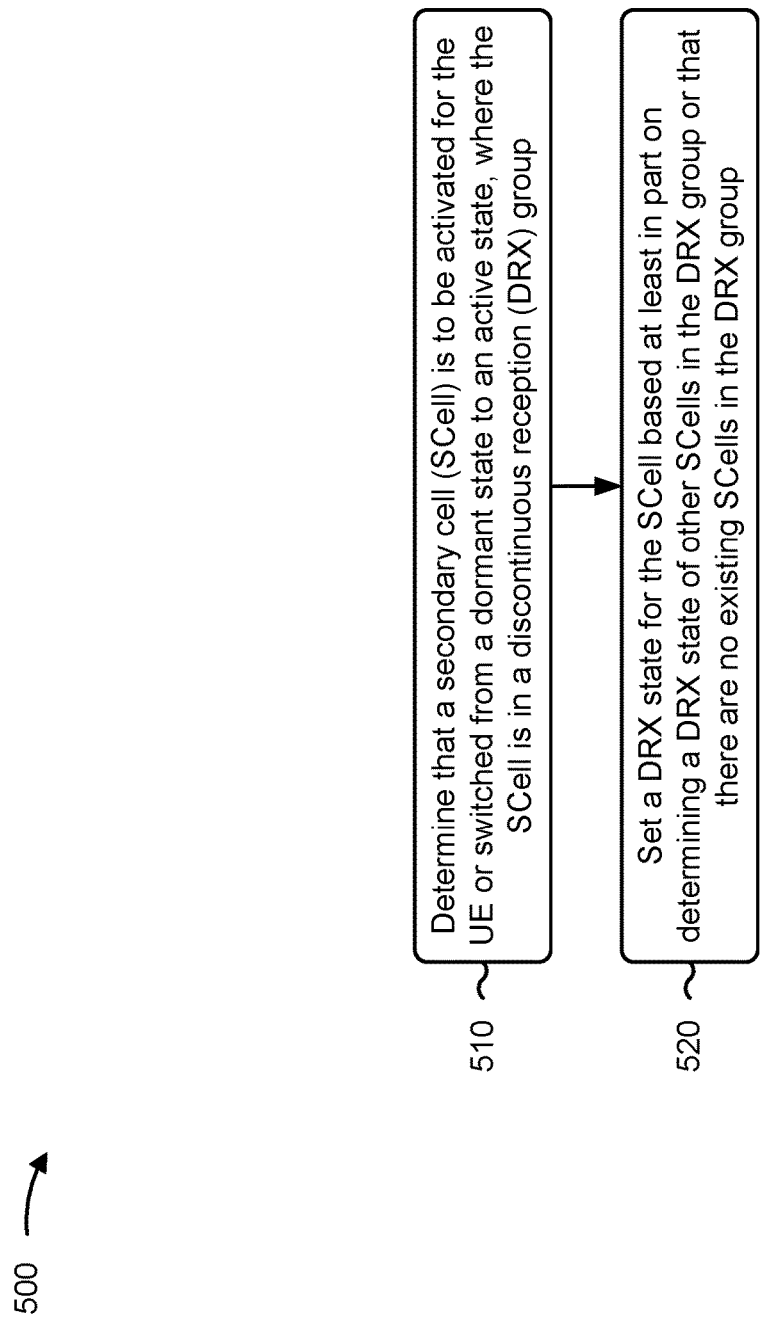
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120 depicted in FIGS. 1 and 2, UE 420 depicted in FIG. 4) performs operations associated with secondary cell activation with DRX groups.

As shown in FIG. 5, in some aspects, process 500 may include determining that an SCell is to be activated for the UE or switched from a dormant state to an active state (block 510). For example, the UE (e.g., using receive processor 258, transmit processor 264, controller/processor 280, memory 282) may determine that an SCell is to be activated for the UE or switched from a dormant state to an active state, as described above. In some aspects, the SCell is in a DRX group.

As further shown in FIG. 5, in some aspects, process 500 may include setting a DRX state for the SCell based at least in part on determining a DRX state of other SCells in the DRX group or determining that there are no existing SCells in the DRX group (block 520). For example, the UE (e.g., using receive processor 258, transmit processor 264, controller/processor 280, memory 282) may set a DRX state for the SCell based at least in part on determining a DRX state of other SCells in the DRX group or determining that there are no existing SCells in the DRX group, as described above.

Process 500 may include additional aspects, such as any single aspect or any combination of aspects described below and/or in connection with one or more other processes described elsewhere herein.

In a first aspect, process 500 includes activating monitoring of a physical downlink control channel and transmission on the SCell based at least in part on the UE entering a DRX active state.

In a second aspect, alone or in combination with the first aspect, process 500 includes determining, before activation of the SCell or a transition of the SCell from a dormant state to active state, that there are no other SCells in the DRX group, and setting the DRX state for the SCell includes setting the DRX state for the SCell to immediately enter a DRX active state.

In a third aspect, alone or in combination with one or more of the first and second aspects, process 500 includes determining, before activation of the SCell or a transition of the SCell from a dormant state to active state, that other SCells of the DRX group are in a DRX active state, and setting the DRX state for the SCell includes setting the DRX state for the SCell and the other SCells to immediately enter the DRX active state.

In a fourth aspect, alone or in combination with one or more of the first through third aspects, process 500 includes determining, before activation of the SCell or a transition of the SCell from a dormant state to active state, that other SCells of the DRX group are in a DRX inactive state, and setting the DRX state for the SCell includes setting the DRX state for the SCell to the DRX inactive state with the other SCells of the DRX group.

In a fifth aspect, alone or in combination with one or more of the first through fourth aspects, process 500 includes receiving an indication from a base station to enter a DRX active state immediately or set the SCell to an activation state based at least in part on an activation state of other SCells in the DRX group.

In a sixth aspect, alone or in combination with one or more of the first through fifth aspects, process 500 includes comprising transmitting an indication that the UE is capable of setting the DRX state for the SCell to immediately enter a DRX active state based at least in part on a determination that no other SCells exist for the DRX group.

In a seventh aspect, alone or in combination with one or more of the first through sixth aspects, process 500 includes determining that the SCell is in the DRX group.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
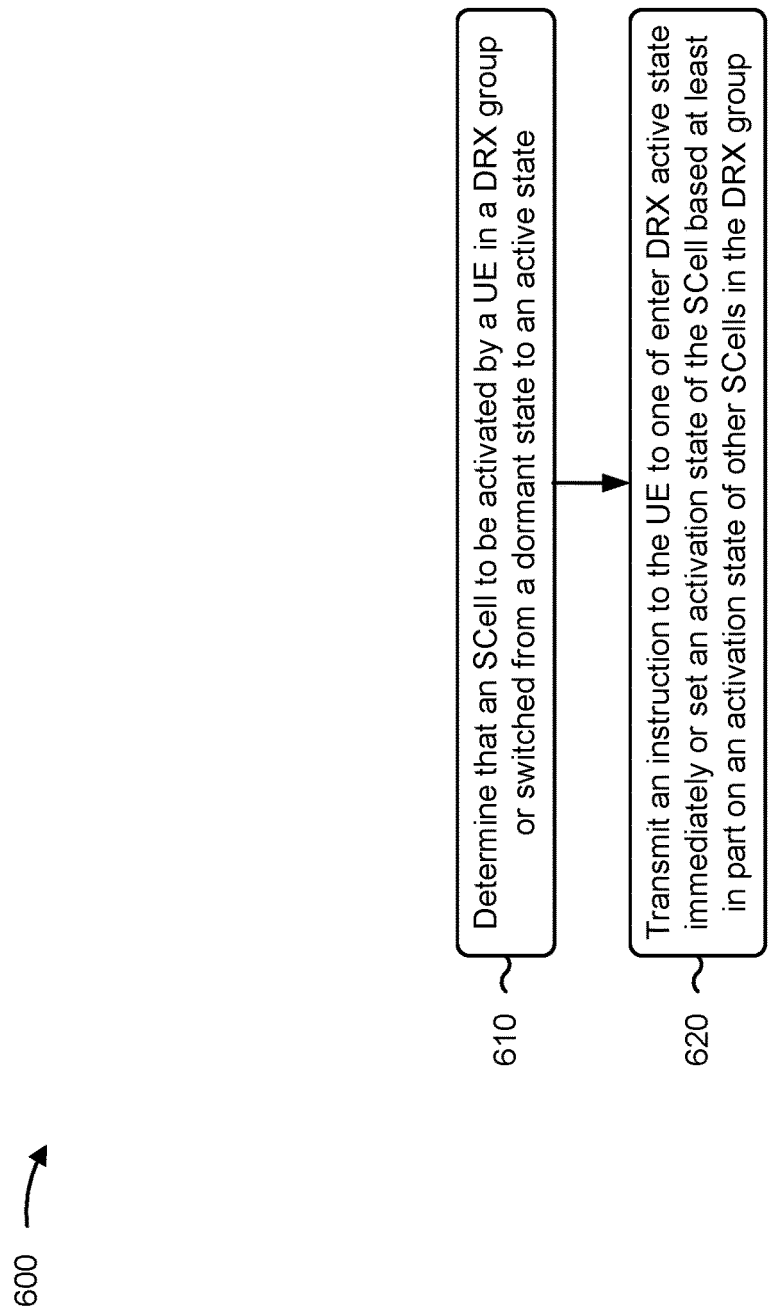
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., BS 110 depicted in FIGS. 1 and 2, BS 410 depicted in FIG. 4) performs operations associated with secondary cell activation with DRX groups.

As shown in FIG. 6, in some aspects, process 600 may include determining that an SCell to be activated by a UE is in a DRX group or switched from a dormant state to an active state (block 610). For example, the base station (e.g., using transmit processor 220, receive processor 238, controller/processor 240, memory 242) may determine that an SCell to be activated by a UE is in a DRX group or switched from a dormant state to an active state, as described above.

As further shown in FIG. 6, in some aspects, process 600 may include transmitting an instruction to the UE to set a DRX state for the SCell based at least in part on determining a DRX state of other SCells in the DRX group or determining that there are no existing SCells in the DRX group (block 620). For example, the base station (e.g., using transmit processor 220, receive processor 238, controller/processor 240, memory 242) may transmit an instruction to the UE to set a DRX state for the SCell based at least in part on determining a DRX state of other SCells in the DRX group or determining that there are no existing SCells in the DRX group, as described above.

Process 600 may include additional aspects, such as any single aspect or any combination of aspects described below and/or in connection with one or more other processes described elsewhere herein.

In a first aspect, the instruction instructs the UE to set the DRX state for the SCell to immediately enter a DRX active state, based at least in part on a determination that there are no other SCells in the DRX group.

In a second aspect, alone or in combination with the first aspect, the instruction instructs the UE to set the DRX state for the SCell and the other cells to immediately enter a DRX active state, based at least in part on a determination that other SCells of the DRX group are in an activation state.

In a third aspect, alone or in combination with one or more of the first and second aspects, the instruction instructs the UE to set the DRX state for the SCell to the DRX inactive state with the other SCells of the DRX group, based at least in part on a determination that the other SCells of the DRX group are in an inactive state.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some aspects of the present disclosure:

Aspect 1: A method of wireless communication performed by a user equipment (UE), comprising: determining that a secondary cell (SCell) is to be activated for the UE or switched from a dormant state to an active state, wherein the SCell is in a discontinuous reception (DRX) group; and setting a DRX state for the SCell based at least in part on determining a DRX state of other SCells in the DRX group or determining that there are no existing SCells in the DRX group.

Aspect 2: The method of aspect 1, further comprising activating monitoring of a physical downlink control channel and transmission on the SCell based at least in part on the UE entering a DRX active state.

Aspect 3: The method of aspect 1 or 2, further comprising determining, before activation of the SCell or a transition of the SCell from a dormant state to active state, that there are no other SCells in the DRX group, and wherein setting the DRX state for the SCell includes setting the DRX state for the SCell to immediately enter a DRX active state.

Aspect 4: The method of aspect 1 or 2, further comprising determining, before activation of the SCell or a transition of the SCell from a dormant state to active state, that other SCells of the DRX group are in a DRX active state, and wherein setting the DRX state for the SCell includes setting the DRX state for the SCell and the other SCells to immediately enter the DRX active state.

Aspect 5: The method of aspect 1 or 2, further comprising determining, before activation of the SCell or a transition of the SCell from a dormant state to active state, that other SCells of the DRX group are in a DRX inactive state, and wherein setting the DRX state for the SCell includes setting the DRX state for the SCell to the DRX inactive state with the other SCells of the DRX group.

Aspect 6: The method of any of aspects 1-5, further comprising receiving an indication from a base station to enter a DRX active state immediately or set the SCell to an activation state based at least in part on an activation state of other SCells in the DRX group.

Aspect 7: The method of any of aspects 1-6, further comprising transmitting an indication that the UE is capable of setting the DRX state for the SCell to immediately enter a DRX active state based at least in part on a determination that no other SCells exist for the DRX group.

Aspect 8: The method of any of aspects 1-7, further comprising determining that the SCell is in the DRX group.

Aspect 9: A method of wireless communication performed by a base station, comprising: determining that a secondary cell (SCell) to be activated by a user equipment (UE) is in a discontinuous reception (DRX) group or switched from a dormant state to an active state; and transmitting an instruction to the UE to set a DRX state for the SCell based at least in part on determining a DRX state of other SCells in the DRX group or determining that there are no existing SCells in the DRX group.

Aspect 10: The method of aspect 9, wherein the instruction instructs the UE to set the DRX state for the SCell to immediately enter a DRX active state, based at least in part on a determination that there are no other SCells in the DRX group.

Aspect 11: The method of aspect 9, wherein the instruction instructs the UE to set the DRX state for the SCell and the other cells to immediately enter a DRX active state, based at least in part on a determination that other SCells of the DRX group are in an activation state.

Aspect 12: The method of aspect 9, wherein the instruction instructs the UE to set the DRX state for the SCell to a DRX inactive state with the other SCells of the DRX group, based at least in part on a determination that the other SCells of the DRX group are in an inactive state.

Aspect 13: An apparatus for wireless communication at a device, comprising a processor; memory coupled with the processor; and instructions stored in the memory and executable by the processor to cause the apparatus to perform the method of one or more aspects of aspects 1-12.

Aspect 14: A device for wireless communication, comprising a memory and one or more processors coupled to the memory, the memory and the one or more processors configured to perform the method of one or more aspects of aspects 1-12.

Aspect 15: An apparatus for wireless communication, comprising at least one means for performing the method of one or more aspects of aspects 1-12.

Aspect 16: A non-transitory computer-readable medium storing code for wireless communication, the code comprising instructions executable by a processor to perform the method of one or more aspects of aspects 1-12.

Aspect 17: A non-transitory computer-readable medium storing a set of instructions for wireless communication, the set of instructions comprising one or more instructions that, when executed by one or more processors of a device, cause the device to perform the method of one or more aspects of aspects 1-12.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors operatively coupled to the memory, the memory and the one or more processors configured to:
determine that a secondary cell (SCell) is to be activated for the UE or switched from a dormant state to an active state, wherein the SCell is in a discontinuous reception (DRX) group; and
set a DRX state for the SCell based at least in part on determining a DRX state of other SCells in the DRX group or determining that there are no existing SCells in the DRX group.

2. The UE of claim 1, wherein the memory and the one or more processors are configured to activate monitoring of a physical downlink control channel and transmission on the SCell based at least in part on the UE entering a DRX active state.

3. The UE of claim 1, wherein the memory and the one or more processors are configured to determine, before activation of the SCell or a transition of the SCell from a dormant state to active state, that there are no other SCells in the DRX group, and set the DRX state for the SCell to immediately enter a DRX active state.

4. The UE of claim 1, wherein the memory and the one or more processors are configured to determine, before activation of the SCell or a transition of the SCell from a dormant state to active state, that other SCells of the DRX group are in a DRX active state, and set the DRX state for the SCell and the other SCells to immediately enter the DRX active state.

5. The UE of claim 1, wherein the memory and the one or more processors are configured to determine, before activation of the SCell or a transition of the SCell from a dormant state to active state, that other SCells of the DRX group are in a DRX inactive state, and set the DRX state for the SCell to the DRX inactive state with the other SCells of the DRX group.

6. The UE of claim 1, wherein the memory and the one or more processors are configured to receive an indication from a base station to enter a DRX active state immediately or set the SCell to an activation state based at least in part on an activation state of other SCells in the DRX group.

7. The UE of claim 1, wherein the memory and the one or more processors are configured to transmit an indication that the UE is capable of setting the DRX state for the SCell to immediately enter a DRX active state based at least in part on a determination that no other SCells exist for the DRX group.

8. The UE of claim 1, wherein the memory and the one or more processors are configured to determine that the SCell is in the DRX group.

9. A base station for wireless communication, comprising:
a memory; and
one or more processors operatively coupled to the memory, the memory and the one or more processors configured to:
determine that a secondary cell (SCell) to be activated by a user equipment (UE) is in a discontinuous reception (DRX) group or switched from a dormant state to an active state; and
transmit an instruction to the UE to set a DRX state for the SCell based at least in part on determining a DRX state of other SCells in the DRX group or determining that there are no existing SCells in the DRX group.

10. The base station of claim 9, wherein the instruction instructs the UE to set the DRX state for the SCell to immediately enter a DRX active state, based at least in part on a determination that there are no other SCells in the DRX group.

11. The base station of claim 9, wherein the instruction instructs the UE to set the DRX state for the SCell and the other cells to immediately enter a DRX active state, based at least in part on a determination that other SCells of the DRX group are in an activation state.

12. The base station of claim 9, wherein the instruction instructs the UE to set the DRX state for the SCell to a DRX inactive state with the other SCells of the DRX group, based at least in part on a determination that the other SCells of the DRX group are in an inactive state.

13. A method of wireless communication performed by a user equipment (UE), comprising:
determining that a secondary cell (SCell) is to be activated for the UE or switched from a dormant state to an active state, wherein the SCell is in a discontinuous reception (DRX) group; and setting a DRX state for the SCell based at least in part on determining a DRX state of other SCells in the DRX group or determining that there are no existing SCells in the DRX group.

14. The method of claim 13, further comprising activating monitoring of a physical downlink control channel and transmission on the SCell based at least in part on the UE entering a DRX active state.

15. The method of claim 13, further comprising determining, before activation of the SCell or a transition of the SCell from a dormant state to active state, that there are no other SCells in the DRX group, and wherein setting the DRX state for the SCell includes setting the DRX state for the SCell to immediately enter a DRX active state.

16. The method of claim 13, further comprising determining, before activation of the SCell or a transition of the SCell from a dormant state to active state, that other SCells of the DRX group are in a DRX active state, and wherein setting the DRX state for the SCell includes setting the DRX state for the SCell and the other SCells to immediately enter the DRX active state.

17. The method of claim 13, further comprising determining, before activation of the SCell or a transition of the SCell from a dormant state to active state, that other SCells of the DRX group are in a DRX inactive state, and wherein setting the DRX state for the SCell includes setting the DRX state for the SCell to the DRX inactive state with the other SCells of the DRX group.

18. The method of claim 13, further comprising receiving an indication from a base station to enter a DRX active state immediately or set the SCell to an activation state based at least in part on an activation state of other SCells in the DRX group.

19. The method of claim 13, further comprising transmitting an indication that the UE is capable of setting the DRX state for the SCell to immediately enter a DRX active state based at least in part on a determination that no other SCells exist for the DRX group.

20. The method of claim 13, further comprising determining that the SCell is in the DRX group.

21. A method of wireless communication performed by a base station, comprising:
determining that a secondary cell (SCell) to be activated by a user equipment (UE) is in a discontinuous reception (DRX) group or switched from a dormant state to an active state; and
transmitting an instruction to the UE to set a DRX state for the SCell based at least in part on determining a DRX state of other SCells in the DRX group or determining that there are no existing SCells in the DRX group.

22. The method of claim 21, wherein the instruction instructs the UE to set the DRX state for the SCell to immediately enter a DRX active state, based at least in part on a determination that there are no other SCells in the DRX group.

23. The method of claim 21, wherein the instruction instructs the UE to set the DRX state for the SCell and the other cells to immediately enter a DRX active state, based at least in part on a determination that other SCells of the DRX group are in an activation state.

24. The method of claim 21, wherein the instruction instructs the UE to set the DRX state for the SCell to a DRX inactive state with the other SCells of the DRX group, based at least in part on a determination that the other SCells of the DRX group are in an inactive state.

\* \* \* \* \*